(12) United States Patent
Vannest

(10) Patent No.: US 7,931,133 B2
(45) Date of Patent: Apr. 26, 2011

(54) SYSTEM FOR SELF-ADJUSTING HEIGHT AND DIRECTION OF A MOVABLE POWER CABLE

(75) Inventor: Matthew Vannest, Tecumseh (CA)

(73) Assignee: Soave Enterprises L.L.C., Detroit, MI (US)

( * ) Notice: Subject to any disclaimer, the term of this patent is extended or adjusted under 35 U.S.C. 154(b) by 605 days.

(21) Appl. No.: 12/008,973

(22) Filed: Jan. 16, 2008

(65) Prior Publication Data
US 2009/0178895 A1    Jul. 16, 2009

(51) Int. Cl.
*B66C 13/12* (2006.01)
(52) U.S. Cl. .................................... 191/12.2 R
(58) Field of Classification Search ............... 191/12 R, 191/12.2 R, 12.4; 180/2.1; 242/370, 388, 242/398, 557, 558; 114/253, 322, 326, 328; 414/137.9, 138.2, 138.4
See application file for complete search history.

(56) References Cited

U.S. PATENT DOCUMENTS 3,533,483 A * 10/1970 Ballinger ................. 180/9.38
4,587,383 A * 5/1986 Stoldt .......................... 191/12 R
* cited by examiner

*Primary Examiner* — S. Joseph Morano
*Assistant Examiner* — R. J. McCarry, Jr.
(74) *Attorney, Agent, or Firm* — Bernard J. Cantor

(57) ABSTRACT

This invention relates to a system for automatically self-adjusting the height, length and direction of an electrical power cable connecting a movable machine, such as a crane, to a fixed electrical power supply. One end of the cable is wrapped around a reel which is arranged within a housing that is freely rotatable about a vertical axis. That end is connected to an electrical power source. The opposite end of the cable is connected to a machine which is moveable towards and away from, and around, the reel. A motor rotates the reel for winding up, and applying a tension upon, the cable so that the center portion of the cable, which extends between the reel and machine, is held relatively taut and generally horizontal. The central portion of the cable extends through a vertical slot in the housing so that its height, length and direction of extension towards the machine are automatically adjusted in response to the position of the moveable machine relative to the reel.

5 Claims, 2 Drawing Sheets

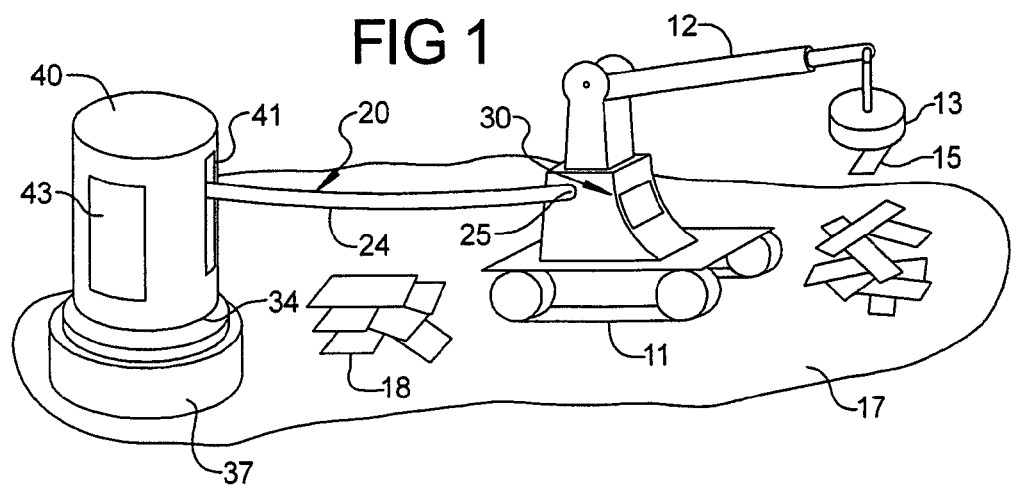
FIG 1
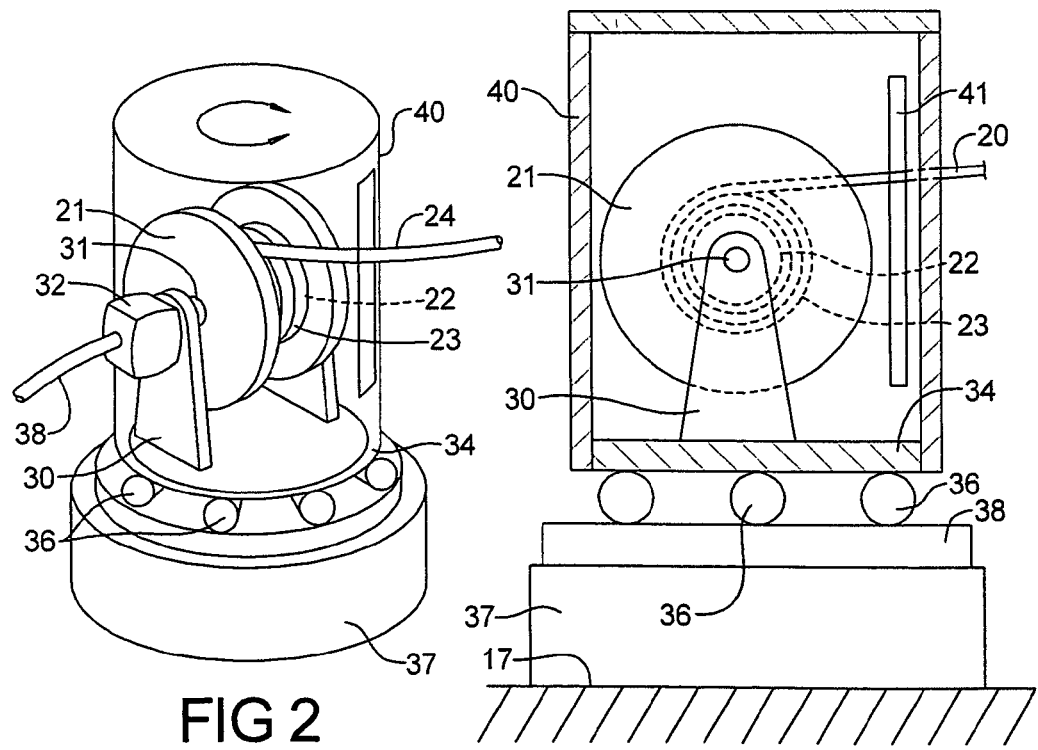
FIG 2
FIG 3

SYSTEM FOR SELF-ADJUSTING HEIGHT AND DIRECTION OF A MOVABLE POWER CABLE

FIELD OF THE INVENTION

This invention relates to a system which automatically adjusts the height, length, and direction of extension of an electrical power supply cable which connects a moveable machine to a fixed electrical power supply.

BACKGROUND OF THE INVENTION

In scrap collection yards where large quantities of pieces of metal scrap material are temporarily stored, mobile cranes are utilized for lifting and moving scrap pieces from one location to another. Such cranes can consist of a large tractor or vehicle upon which a boom is mounted, with the boom terminating in an electromagnetic device for attracting and picking up ferrous metal pieces. The tractor-like vehicles may be driven about the yard to pick up and deliver pieces of scrap material from one location to another. Because electromagnetic devices require an electrical power source, a power delivery cable can be attached to the vehicle at one end and have an opposite end connected to an electrical power terminal to which electricity is delivered from a power supply company or the like.

In the environment of a scrap yard, where there may be piles of debris or piles of scrap material, the crane must be driven carefully around and about the yard. Thus, the power supply cable must be similarly moveable in response to the location of the crane. However, where the cable is simply attached at one end to the power source and moved upon the ground to the crane vehicle, there is a danger of the vehicle running over the cable or tangling the cable in other piles of scrap or debris around which the vehicle moves.

Thus, in that kind of environment, and in similar types of environments where electromagnetic cranes and the like are used and power supply cables are needed to supply the electricity for the equipment, it is desirable to keep the cable well above the ground and at the same time form the cable in such a manner that it self-adjusts its direction of extension and its height above the ground, as well as keeping it taut and generally horizontal in response to the varying locations of the crane carrying vehicle. Thus, it would be desirable to have a self-adjusting mechanism or equipment which automatically, without manual intervention, consistently maintains the cable taut, well above the ground, generally straight and approximately horizontal above debris and other piles, and directed in a straight line from the power source to the vehicle no matter where the vehicle wanders about the location. The invention herein is concerned with providing such automatic self-adjusting cable equipment.

SUMMARY OF THE INVENTION

The invention herein contemplates providing an electrical power transmission cable having one end connected to a moveable or mobile vehicle or other moveable machine or piece of equipment and an opposite end connected to a fixed power source or supply terminal. At that source or power supply terminal, a reel is provided about which an end portion of the cable may be wound. The reel is provided with a motor which tends to wind-up the cable end portion and, thus, keeps the cable substantually taut. Thus, the central portion of the cable extends toward the mobile machine in a, generally taut, straight line well above the ground'

The reel is mounted upon a freely rotatable support so that as the cable extends toward the machine or is retracted toward the reel, depending upon the movement of the machine, the reel will rotate about a vertical axis so as to automatically keep the cable directly aimed from the reel towards the machine.

In order to protect the reel and to provide part of the turning mechanism for the reel, a rotatable housing or turret encloses the reel. The turret is rotatable freely so that the reel and turret rotate together to maintain the straight extension of the cable from the reel towards the machine as the machine moves in a 360-degree arc of varying radii around the turret.

The turret or housing is provided with an opening through which the cable passes. The opening is in the form of a vertically elongated slot having guide rollers on the opposite vertical edges which define the slot. Thus, the cable may move transversely upwardly and downwardly within the slot in response to the machine moving towards and away from the turret and the reel. In that way, the height of the cable above the ground is maintained at a substantial enough distance to clear anticipated debris or other obstacles laying on the ground between the turret and the machine. Simultaneously, the length of the extended central portion of the cable is adjusted depending upon how close or how far away from the reel the machine is located.

Hence, it is an object of this invention to provide a simple, relatively inexpensive piece of equipment which will automatically adjust the direction of extension and the length of the extension of the power cable which connects a static or fixed electrical power terminal to a power-using, mobile machine, and to maintain the cable in a generally straight, horizontal direction well above the ground to prevent the cable from dipping downwardly and engaging obstacles on the ground or the ground itself.

A further object of this invention is to provide a simple, easily fabricated piece of equipment which will protect a power cable from being run over or from engaging obstacles as the cable is extended from a fixed power source to a moveable or moving of machine such as a mobile crane or the like.

A still further object of this invention is to provide equipment for self-adjusting the height, direction of extension, and generally taut condition of a power supply cable connecting a power supply terminal to a moveable machine which equipment is of simple construction and is easily operable and can be easily maintained within a harsh environment, such as in a metal scrap yard or other harsh environments where a cablet might be easily damaged.

These and other objects and advantages of this invention will become apparent upon reading the following description, of which the attached drawings form a part.

DESCRIPTION OF THE DRAWINGS

The drawings described herein are for illustration purposes only and are not intended to limit the scope of the present invention in any way.

FIG. 1 schematically illustrates a mobile crane having an electromagnetic pick-up device for attracting ferrous objects, with the power cable connected to the equipment at one end and with its opposite end connected to a freely rotatable turret or housing and the cable extending generally horizontally over debris located on the ground between the turret and the mobile crane.

FIG. 2 is a schematic perspective drawing illustrating, in some phantom lines, the turret or housing within which a wind-up reel is located, with the turret mounted upon a rotatable support.

FIG. 3 is a schematic, side view of the reel and its support and the housing shown in cross-section.

DETAILED DESCRIPTION

Figure 4:
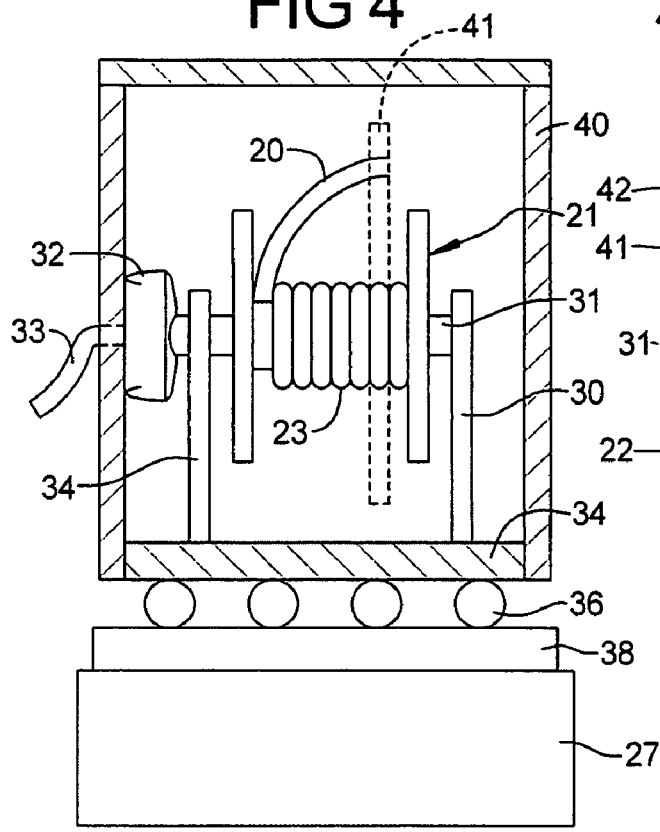
FIG. 4 is a cross-sectional view of the housing and support with the reel shown in elevational side view.

Referring to FIG. 1, a mobile crane 10 of conventional construction is illustrated within a scrap yard environment. The crane comprises a vehicle or track type machine 11 having a boom 12 which may be moved horizontally and vertically. From the boom, an electromagnetic pick-up device 13 is suspended. By moving the boom and by raising and lowering the pick-up device, scrap ferrous metal pieces can be magnetically attracted and removed from one location and delivered to another. The scrap metal pieces 15 are schematically illustrated as forming a pile or heap 16 on the ground 17.

In a typical scrap yard, there would also be piles of rubble or other scrap piles 18 which may get in the way of movement of the vehicle and/or interfere with the cable connection to the electrical power source or terminal which supplies the electrical power needed for the magnetic pick-up device or for operating the machine.

The mobile machine is connected by an electrical power cable 20 stretching from the machine to a reel 21 illustrated, for example, in FIGS. 2 and 3. The reel 21 is provided with a hub 22 around which the end portion 23 of the cable is wrapped.

From the reel, the central portion 24 of the cable extends towards the machine and is connected thereto in a conventional manner (not illustrated). Thus, the free end of the cable 25 is schematically shown as attached to the machine without detailing commercially available conventional equipment for that purpose.

The reel is mounted upon support stanchions 30 connected to the axle 31 of the reel. Preferably the reel is rotatable about a horizontal axle for winding up the cable end portion.

Winding up; or turning the reel in the winding up direction simultaneously applies a pulling force or tension upon the central portion of the cable, to tend to hold the cable relatively taut. Thus, a suitable wind-up motor 32 is connected to the axle of the reel. Conventional motor equipment and motor controls are available commercially and will serve this purpose. An appropriate size and power output motor and motor control can be selected and obtained by those skilled in the art.

An electrical supply wire 33 is connected to the motor or control and also is connected to the cable wound around the reel. These electrical connections are illustrated schematically in the drawings since conventional connections are commercially available for this purpose. Consequently the detailed connections are not described in more detail here. Thus, the power cable is provided with electrical current and is positioned in a fixed location around which the mobile machine is intended to move.

The reel stanchions 30 support the reel upon a support base 34 which in turn, as schematically shown, is rotatably rested upon roller support bars 36 which in turn are located upon a roller plate 38 carried upon a ground support structure 37.

Preferably the ground support structure is of considerable height and may be formed of concrete or other similar sturdy material for supporting the turret and reel structure and holding them in place.

The reel is enclosed within a housing or turret 40, as mentioned above, which forms a cylindrical enclosure above the reel support base 34. Thus, the turret along with the reel is freely rotatable about a vertical axis. The reel, in this embodiment, is rotatable about a horizontal axis.

Figure 5:
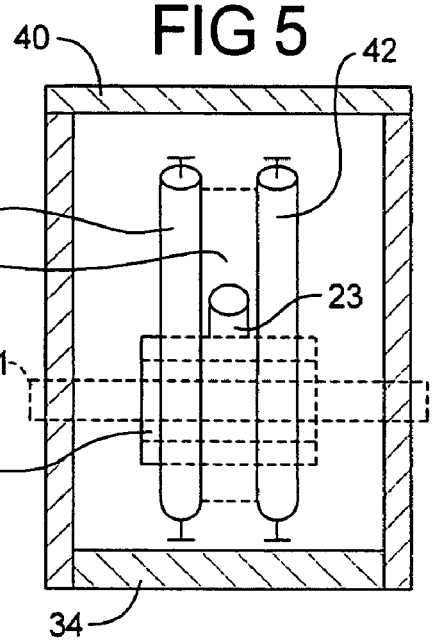
FIG. 5 is a perspective fragmentary view showing schematically the elongated slot and the elongated guide rollers arranged within the housing.
Figure 6:
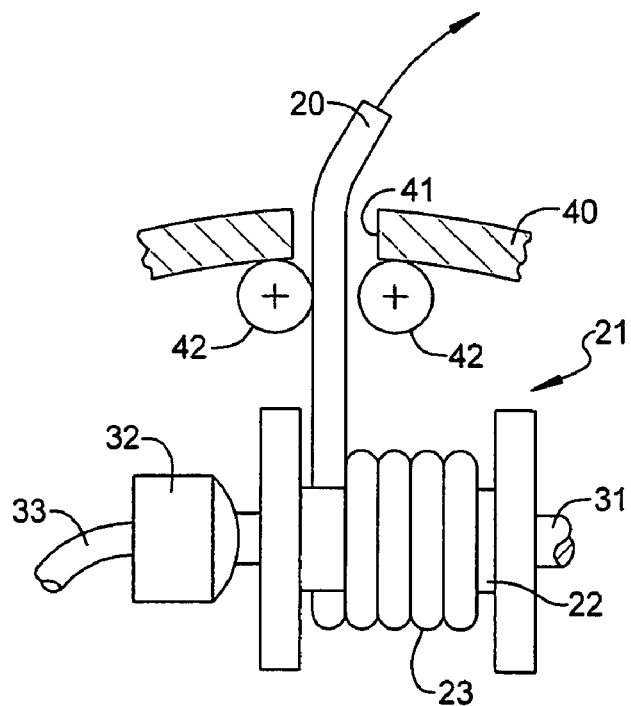
FIG. 6 is an enlarged fragmentary view schematically illustrating a top view of the reel, the cable, the slot and the rollers through which the cable moves.

The cable 20 extends out of the housing through a vertical slot 41 so that the cable may move transversely upwardly and downwardly in response to the movement of the mobile machine towards and away from the reel. Preferably, the cable is protected against chafing or binding on the edges of the slot by vertically arranged, elongated, guide rollers 42 which are mounted within the housing along the opposite edges of the slot. FIGS. 5 and 6 schematically illustrate the arrangement of the rollers.

In operation, as the mobile vehicle moves towards and away from the fixed position reel and also moves around the reel, that is, around the 360 degree area surrounding the reel, the cable is automatically redirected so that it is aimed directly from the reel to the mobile equipment. That is accomplished because the reel will rotate around the vertical axis to maintain the direction of the cable. At the same time, the height of the cable will vary but will remain high above the ground with the cable being relatively taut and horizontal and held in that condition by the tension applied through the motor force on the reel. The length of the cable center portion will vary depending upon the distance between the mobile crane equipment and the reel but the cable will not droop down to engage the ground or debris on the ground because it will be held high above the ground as indicated.

While the equipment is described, in the foregoing embodiment, as operating within a scrap yard, similar equipment can be utilized in other places where mobile machinery requires electrical power. Thus, it is intended that the foregoing description be illustrative and not be limited to the embodiment described herein.

Having fully described an operative embodiment and the best mode known, it is desired that the foregoing description be read as being merely illustrative of an operative embodiment and not in a strictly limiting sense. Accordingly, the invention here is claimed as follows:

What is claimed is:

1. A cable connector for connecting an electrical power cable for a mobile electrically powered machine to a fixed location electrical power supply source, wherein the machine is moveable during its operation to and from and around the fixed location power supply, comprising:

an elongated electrical power transmission cable having a remote end adapted to be connected to a mobile machine and an electrical supply end for connection to a fixed location electrical power supply source and having an elongated central portion between said ends;

a rotatable reel arranged to rotate around a horizontal axis, about which reel the supply end portion is wound, with said reel being provided with a motor arranged to apply a wind-up force upon the reel for winding the cable supply end portion and central portion around the reel and for providing a force upon the unwound part of the central portion of the cable for generally keeping said central portion substantially taut and straight during movements of said machine;

said reel being mounted upon a rotatable support which is elevated above the ground and which is freely rotatable about a generally vertically arranged axis for thereby directly aligning the cable central portion between the reel and the machine at above the ground upon which the machine moves in response to the horizontal and vertical movements and location of the machine relative to the reel;

a housing, mounted on said support, surrounding, covering and substantially enclosing the reel and carried by the rotatable support for rotating about the vertical axis with the reel whereby the reel is protected against damage by impacts from objects during operation of the machine;

said housing having a vertically elongated slot through which the cable central portion passes as it extends between the reel and the machine with the cable being freely moveable upwardly and downwardly within the slot;

whereby the cable central portion is maintained generally taut and extended directly between the reel and machine, but will vary in height above ground upon which the support is mounted, during movements of the machine towards and away from the reel and around the reel so that the cable is arranged at a vertical height above the ground during movement of the machine.

2. A cable connector for connecting an electrical power cable between a mobile electrically powered machine and a fixed location electrical power supply, and as set forth in claim 1, and including said machine including a movable crane with an electrically powered lifting member for moving and lifting objects located at varying distances and varying angles relative to the location of the power supply.

3. A cable connector as defined in claim 1, wherein said reel is mounted for rotation about a horizontal axis located above the support and the cable normally having its central portion extending a greater and shorter distance in response to the distance between the mobile machine and the reel, with the cable arranged at a varying height in response to the wind-up force of the reel so that the cable is normally arranged above articles that may be located upon the ground during movement of the machine relative to the fixed electrical power source.

4. A system for self-adjusting the height and direction of an elongated power cable connecting a mobile machine to a fixed electrical power source, comprising:

an elongated power cable having a free-end portion adapted to be connected to a mobile machine, such as a mobile crane;

a reel around which the opposite end portion of the cable is wrapped, and said cable having an elongated central portion extending between the free end portion and the reel;

said reel being mounted upon a substantially freely rotatable support having a vertical axis of rotation;

a housing having a wall surrounding and enclosing said reel and being mounted upon said rotatable support for rotating with the reel about said vertical axis.

a vertically elongated slot formed in the wall of said housing and said cable extending from the reel through the slot for freely moving up and down relative to the housing during end-wise movement of the cable in response to movement of the machine toward and away from the reel;

a motor connected to the reel for applying a wind-up force upon the reel for winding the cable upon the reel and simultaneously applying end-wise tension upon the cable in the wind-up direction;

an electrical connection member connecting the cable portion on the reel to a fixed electrical power supply source;

whereby the cable central portion is stretched under tension by the reel wind-up force for holding it substantially horizontally and above the ground, upon which the support is positioned, and extending directly towards the machine in a radial direction between the reel and the machine during movements and changing locations of the machine around the location of the power source and at varying distances from the power source, and the reel and wound-up portions of the cable are protected against damage from impacts of objects that may be located near the support.

5. A system as set forth in claim 4 above, and including said support comprising a fixed base upon which a rotatable support plate is positioned, with the plate being freely rotatable about a vertical axis upon the support base; and said reel and said housing being mounted upon said plate for concurrent rotation with the plate for thereby automatically, self-adjusting, the direction and length of extension of the central portion of the power cable from the reel to the machine as the machine moves around to and away from the support.

* * * * *